United States Patent Office 3,474,378
Patented Oct. 21, 1969

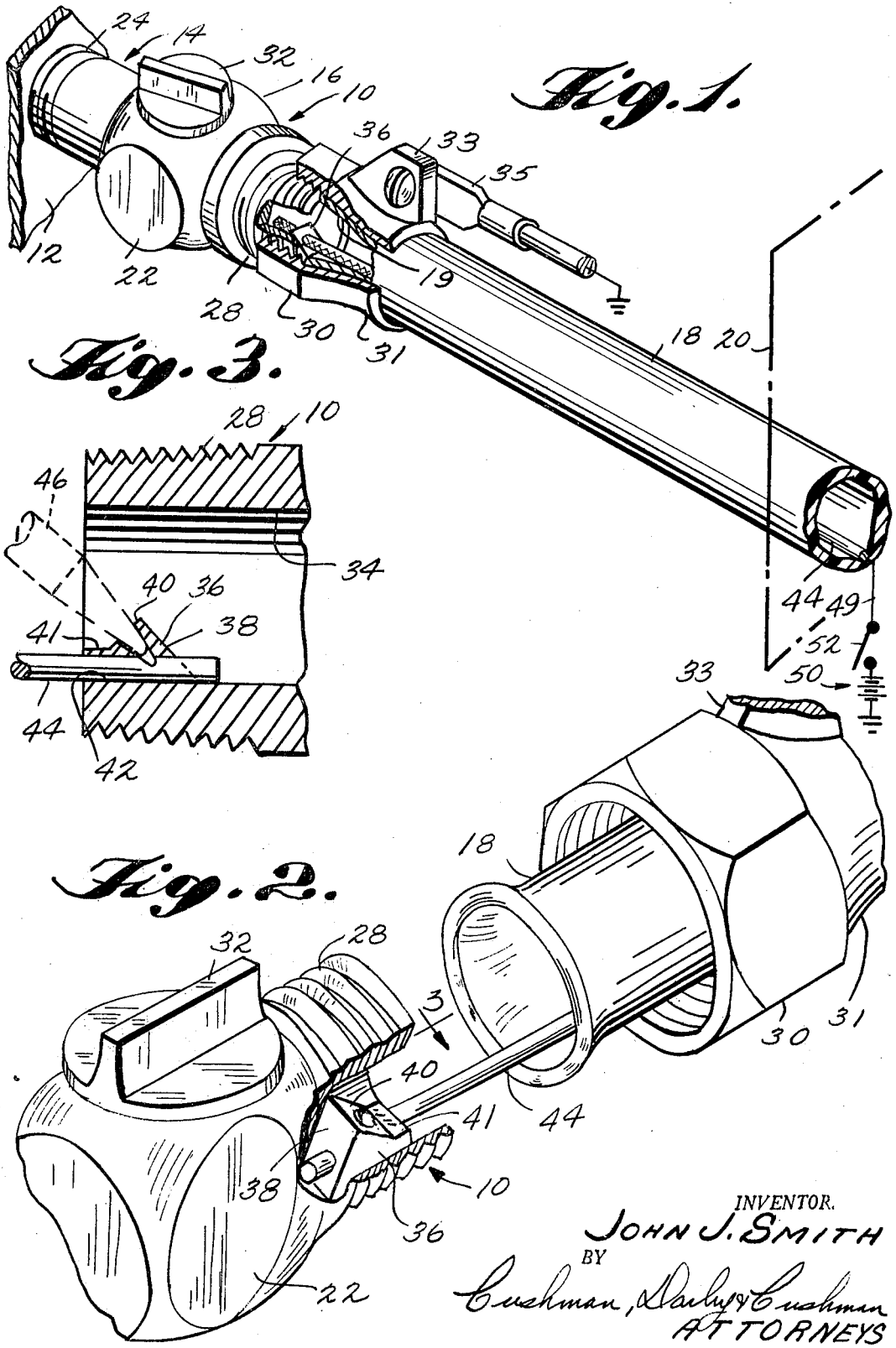

3,474,378
WATER SERVICE FITTING WITH THAW WIRE CONNECTION
John J. Smith, Decatur, Ill., assignor to Mueller Co., Decatur, Ill., a corporation of Illinois
Filed Mar. 31, 1967, Ser. No. 627,415
Int. Cl. H01r 3/04, 5/00
U.S. Cl. 339—15                    9 Claims

ABSTRACT OF THE DISCLOSURE

A water service fitting for use in connecting an end of a thaw resistance wire extending through a water pipe made of a non-conductive material, the fitting being made of a conductive material and having a lug integrally formed within the bore thereof for receiving and retaining the wire, the lug being designed to cause a minimum of turbulence in water flow and ease of attachment of the thaw wire.

---

The present invention relates to a water service fitting for use in water systems provided with a thaw wire in a water pipe made of non-conductive material, the fitting being made of an electrically conductive material and having means therein for easy connection of the end of the thaw wire.

In the extremely frigid areas, such as Alaska or the like, water services such as water mains and service pipes are often buried ten feet deep in an effort to avoid freezing of the water within. Since the water main is usually of relatively large diameter and has water more or less continuously flowing therein, the dangers of water in the main freezing are minimized. However, the small diameter service pipes which extend from the main to the building, even though they are buried quite deep, sometimes freeze in the winter months unless the water is allowed to flow continuously. Since it is costly and not practical to continuously flow water in the service pipes, means have been provided to heat the same. In situations where the service pipe is copper, connections are made to the system adjacent the corporation stop and main and at the building end of the service pipe, the connections being to electrical leads with the copper tubing of the service pipe being utilized to complete the circuit. If the service pipe freezes, the current is turned on at the building and the service pipe is heated so that the ice therein melts.

While the above system for thawing service pipes made of copper, or for that matter iron has been satisfactory, there was still the problem of the service pipe splitting when the water therein freezes and expands. More recently in the frigid areas, service pipes have been made of a resilient plastic material which is non-conductive of electricity. In such an arrangement, a resistance wire or coil was run through the plastic service pipe and connected at its ends to metallic fittings, the metallic fittings being conductors to which leads from a suitable source of electricity were connected. In the metallic fittings used, the ends of the thaw wire were connected to terminals separately attached to the interior of the fitting, the terminals having a screw for clamping the wire in place. Such an arrangement proved difficult to assemble and the threading operation of the thaw wire through the terminal was of doubtful strength. Also the cost to produce the fittings was high due to the necessity of securing the terminal to the fitting by bolts, studs or the like. The terminals, which extend radially inwardly of the bore of the fitting, were usually quite large and oftentimes caused turbulence and flow loss. In some instances efforts were made to solder the ends of the thaw wire to the interior of the fittings but in these arrangements a strong connection oftentimes did not result and further the actual soldering operation was difficult in the field due to the small area in which the serviceman had to operate.

An object of the present invention is to provide an improved electrically conductive fitting having a simplified means within its bore for connecting a thaw wire extending through a service pipe made of non-conductive material, the fitting being either a coupling member or the end of a pipe.

Another object of the present invention is to provide an improved fitting with an integral lug within its bore for connecting the ends of thaw wires, the fitting being capable of use at the outlet from the main or at the end of the service pipe within the building.

Still another object of the present invention is to provide an improved electrically conductive fitting having means therein for connecting the end of a thaw wire thereto, the means being of such design that it causes a minimum of turbulence in the flow of water through the fitting and therefore a minimum of flow loss.

A still further object of the present invention is to provide an improved electrically conductive fitting having a lug integrally formed within its bore which is arranged to receive and tightly clamp the end of a thaw wire, the fitting being inexpensive to produce and requiring no special tools for quick, easy attachment of the thaw wire.

Ancillary to the immediately preceding objective, it is a further object to produce a fitting made of electrically conductive material and having means formed integrally therein for attaching a thaw wire, there being no separable parts to lose prior to assembly.

These and other objects and advantages of the present invention will appear more fully in the following specification, claims, and drawings in which:

FIGURE 1 is a schematic perspective view of a water system including a service line from a main to a building and incorporating the fittings of the present invention, the fitting adjacent the outlet of the main being shown;

FIGURE 2 is an exploded perspective view showing the fitting partly broken away with the thaw wire connected thereto and further showing the step of assembly of the service pipe to the fitting; and FIGURE 3 is a fragmentary sectional view taken substantially on the line 3—3 of FIGURE 2, the view also illustrating in phantom lines the clamping of the lug to the end of the thaw wire.

Referring now to the drawings wherein like character and reference numerals represent like or similar parts, FIGURE 1 discloses perspectively and schematically a water system incorporating a water service fitting of the present invention generally designated at 10. The water service fitting 10 of the present invention is illustrated as a corportion stop 16, but of course, it could be a coupling, union or the like. In more detail a water main 12 of the usual type and buried in the ground below the normal freeze line is provided with the usual service outlet generally designated at 14. The water main 12, which is made of an electrically conductive material as is the service outlet 14, can either have the service outlet 14 threaded into the wall thereof or the service outlet may be clamped by a saddle arrangement or welded to the wall before the main has been tapped. Usually, the service outlet 14 includes the corporation stop 16 which is merely a plug type valve maintained in the closed position until such time as a service line or pipe 18 is connected thereto. As shown in FIGURE 1 the service line 18, which may be flanged at its ends as indicated at 19, is connected at one end to the outlet end of the corporation stop 16 and at its other end to piping within a building or the like. In FIGURE 1 the phantom lines identified by the numeral 20 represent diagrammatically the wall of a building it being understood that the service line or pipe 18 is connected to the piping within the building by a water fitting (not shown) having thaw wire attachment means substantially identical to that which will be described with respect to the corporation stop 16.

The service pipe 18 is made from a resilient plastic material which is non-conductive of electricity. The purpose of making the service pipe of a resilient material is so that the service pipe, when water does freeze within the same, can expand slightly without cracking or splitting as is often the case of copper pipes.

The attachment means of the present invention for attaching the thaw wire to the fitting 10 is best shown in FIGURES 2 and 3, it being understood that according to the present invention the fitting must be made of an electrically conductive material. Preferably the water service fitting 10, when it is the corporation stop 16, is made of brass, and includes a body 22 having exterior threads 24 on one end for reception in a threaded hole in the wall of the main 12. The other end of the body 22 of fitting 10 is also exteriorly threaded as indicated at 28 for receiving a metallic tube nut 30, preferably made of brass or the like as will be explained in more detail later in the specification. Intermediate the threads 24 and 28, the body 22 is provided with a valve key 32.

Fitting 10 is provided with a through bore 34 of a diameter substantially equal to the interior diameter of the service pipe 18, the through bore 34 being intersected by the key 32 which controls flow through the bore. A lug 36 is formed integrally on the fitting 10 and extends inwardly from the wall of the bore 34 adjacent the outlet end of the fitting. The lug 36 is generally triangular in section in a plane parallel to the plane of the axis of the bore 34 so that it is provided with a pair of sloping substantially planar surfaces 38 and 40 respectively. The sloping surface 40 which faces the terminal edge of the outlet for fitting 10 is provided with a shoulder 41 at its base, the shoulder having its forward edge lying substantially in the plane of the terminal edge of the outlet. It is preferable that the included angle between the intersecting planar surfaces 38 and 40 is in the order of 60° and thus because of the slope of the surfaces flow through the bore 34 of the fitting 10 in either direction is not impeded as much as if the surfaces lay in radial planes. The lug 36 is provided with a hole 42 therethrough, the hole 42 opening to the surface 38 and to the forward edge of the shoulder 41 respectively and having an axis which is parallel to the axis of the bore 34. By arranging the forward edge of the shoulder 41 to lie in a radial plane of the bore 34, the hole 42 may be easily drilled during fabrication of the fitting 10. Additionally, it will be noted that the hole 42 drilled through the lug tangentially engages the wall of the bore 34.

Hole 42 has a diameter substantially equal to the diameter of a thaw resistance wire 44 so that the end of the thaw resistance wire may extend therethrough and against the wall of the bore 34. In order to retain the thaw resistance wire 44 within the hole 32, the lug 36 is crimped by placing a peening tool or center punch 46 against the sloping surface 40 nearest the end of the fitting and then striking the tool sharply with a hammer. This will cause the lug 36 to deform and crimp the end of the thaw wire 44 tightly in the hole 42.

Referring back to FIGURE 1 it will be noted that the thaw or resistance wire 44 extends through the plastic service pipe 18 and is connected to the outlet end of the corporation stop 14 which is broadly defined herein as the water fitting 10. Although not shown in FIGURE 1 it will be appreciated that the other end of the thaw wire 44 is similarly connected to a water fitting (not shown) within the building 20. The fitting to which the end of the thaw wire is connected within the building 20 is provided with a lead 49 to a suitable source of electric power indicated at 50. A switch 52 is provided in this lead. The water service fitting 10 to which the opposite end of the thaw wire 44 is connected is also connected to the common ground of the house. In this respect it will be noted that the tube nut 30 used to couple the flanged or flared end of the plastic service pipe 18 to the corporation stop 16, is provided with an extra long skirt 31. The skirt 31 has an ear 33 extending therefrom to which a terminal end 35 of ground wire 51 extending from the common ground of the house, is connected. Thus, when water freezes within the service pipe 18, the switch 52 is closed completing the circuit through thaw wire 44 so that the thaw wire 44 will heat and melt the ice. Preferably the thaw wire 44 is made of a high resistance material such as sixteen gage aluminum or copper wire.

Referring to FIGURE 2, the securing of the thaw wire in the lug 40 is accomplished in the following manner.

First the water fitting 10, which in the example disclosed in the corporation stop 16, is secured in position on the water main 12 and once it is in position with the clamping lug 36 adjacent its outlet end, then the service line or pipe 18 is placed in position and the thaw wire is threaded from the other end through the same as shown in FIGURE 2 and is put through the hole 40 in the lug 36. The lug 36 is then punched as described above to permanently crimp the wire in position. The tube nut 30 carried on the service pipe 18 is then threaded on the exterior threads 28 to complete the joint. For the purposes of this description, the service pipe 18 has been shown with a flared end for abutting against the interior convex surface of the tube nut 30 but it will be appreciated by those skilled in the art that other types of end arrangements could be provided for retaining the end of service pipe 18 against the fitting 10 in sealing relationship.

It will be seen that the objects and advantages of the present invention have been fully and effectively accomplished by the water service fitting described in the specification and disclosed in the drawings. However, it will be further realized that various changes may be made in the specific embodiment shown and described without departing from the principles of the present invention.

What is claimed is:

1. A water service fitting made of an electrically conductive material and used in connecting an end of a thaw resistance wire extending through a water pipe of a non-conductive material, said fitting comprising: a body having a bore therethrough for the flow of water, said body having a lug within said bore and formed integrally with said body, said lug having a hole therein for receiving the end of the thaw resistance wire, said lug being positioned in said bore of said body adjacent an end of the bore, said lug having a generally planar surface facing the end of said bore which is adjacent the lug, said generally planar surface sloping inwardly at an angle to the axis of said bore and capable of being crimped so as to secure the end of the thaw resistance wire therein.

2. A water service fitting as claimed in claim 1 in which said body is exteriorly threaded on at least the end having the lug therein, said through bore being smooth at least adjacent the end having the lug.

3. A water service fitting as claimed in claim 1 in which said hole in said lug extends through the lug and has an axis substantially parallel with the axis of said bore.

4. A water service fitting as claimed in claim 1 in which said electrically conductive material of said fitting is brass.

5. A water service fitting made of an electrically conductive material and used in connecting an end of a thaw resistance wire extending through a water pipe of a nonconductive material, said fitting comprising: a body having a bore therethrough for the flow of water, said body having a lug within said bore and formed integrally with said body, said lug having a hole therein for receiving the end of the thaw resistance wire, said lug being capable of being crimped so as to secure the end of the thaw resistance wire therein, and said lug being positioned adjacent one end of the bore in said body, said lug being substantially triangular in section through a plane parallel to the axis of the bore to define a pair of sloping substantially parallel surfaces having an inclined angle therebetween in the order of 60° to thereby reduce turbulence in the flow of water through the bore.

6. A water service fitting as claimed in claim 5 in which said hole in said lug extends completely through the same and is open at each of its ends, said hole being parallel to the axis of said bore and tangential to the wall of said bore.

7. A water service fitting as claimed in claim 6 in which said electrically conductive material of said fitting is brass.

8. A water service fitting as claimed in claim 6 including exterior threads on the end of the same having said lug, and an electrically conductive tube nut for cooperating with said threads, said tube nut having an ear projecting therefrom for connection of a ground.

9. A water service fitting as claimed in claim 8 in which said tube nut is brass.

References Cited

UNITED STATES PATENTS

| 693,092 | 2/1902 | Weitz | 339—16 XR |
| 1,750,633 | 3/1930 | Farmer | 339—15 |
| 2,197,392 | 4/1940 | Hawthorn | 174—98 |
| 2,668,215 | 2/1954 | Duerkob. | |
| 3,065,438 | 11/1962 | Anderson | 339—16 |

FOREIGN PATENTS 857,088 11/1952 Germany.

MARVIN A. CHAMPION, Primary Examiner
P. A. CLIFFORD, Assistant Examiner

U.S. Cl. X.R.

339—276